United States Patent [19]

Aufdembrink et al.

[11] Patent Number: 4,929,587

[45] Date of Patent: May 29, 1990

[54] METHOD FOR INTERCALATING ORGANIC-SWELLED LAYERED METAL CHALCOGENIDE WITH POLYMER CHALCOGENIDE BY TREATMENT WITH POLYMERIC CHALCOGENIDE PRECURSOR IN INERT ATMOSPHERE

[75] Inventors: Brent A. Aufdembrink, Wilmington, Del.; Michael E. Landis, Woodbury, N.J.

[73] Assignee: Mobil Oil Corporation, New York, N.Y.

[21] Appl. No.: 314,611

[22] Filed: Feb. 23, 1989

Related U.S. Application Data

[63] Continuation-in-part of Ser. No. 140,529, Jan. 4, 1988, abandoned.

[51] Int. Cl.$^5$ .......................... B01J 21/06; B01J 20/10
[52] U.S. Cl. .................................................. 502/242
[58] Field of Search ................... 502/242, 350, 77, 63; 423/70, 71

[56] References Cited

U.S. PATENT DOCUMENTS 4,600,503  7/1986  Angevine et al. ............... 208/251 H
4,650,779  3/1987  Goldstein ............................ 502/38
4,859,648  8/1989  Landis et al. ...................... 502/242

FOREIGN PATENT DOCUMENTS 0205711  12/1986  European Pat. Off. ..
WO8800090  1/1988  PCT Int'l Appl. ..

OTHER PUBLICATIONS

A. F. Reid et al., "A New Class of Compounds", Acta Cryst (1963), B24, 1228.
W. A. England et al., "Ion Exchange in the $Cs_x[Ti_{2-x2}MgX_2]O_4$ Structure", *Journal of Solid State Chemistry* 49, 300–308 (1983).
I. E. Grey et al., "The Stability and Structure of $C_s[i-2-x/4 \ x/4]O_7$, $0.61 < x < 0.65$", Journal of Solid State Chemistry, 66, 7–19 (1987).

*Primary Examiner*—Carl F. Dees
*Attorney, Agent, or Firm*—A. J. McKillop; C. J. Speciale; E. F. Kenehan, Jr.

[57] ABSTRACT

Organic-swelled layered metal chalcogenide is intercalated with polymeric chalcogenide by contacting with a hydrolyzable polymeric chalcogenide precursor under an inert atmosphere, e.g., nitrogen to minimize formation of extralaminar polymeric chalcogenide. The chalcogenide precursor is then hydrolyzed.

20 Claims, No Drawings

METHOD FOR INTERCALATING ORGANIC-SWELLED LAYERED METAL CHALCOGENIDE WITH POLYMER CHALCOGENIDE BY TREATMENT WITH POLYMERIC CHALCOGENIDE PRECURSOR IN INERT ATMOSPHERE

This application is a continuation-in-part of U.S. application Ser. No. 140,529, filed January 4 1988 (now abandoned), the entire contents of which is expressly being incorporated herein by reference.

The present invention relates to a method for preparing layered metal chalcogenides containing interspathic polymeric chalcogenides. In one aspect, the invention relates to layered metal oxides which contain interspathic metal oxides, e.g., layered titanium oxides which contain interspathic silica. For the purposes of the invention, the term "metal" can be considered to include the elements boron, silicon, phosphorus and arsenic.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the distance between the interlamellar layers can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed by, for example, exposing the clays to high temperatures. Accordingly, such layered materials having enhanced surface area are not suited for use in chemical processes involving even moderately severe conditions.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by substracting the layer thickness from the basal spacing.

Various approaches have been taken to provide layered materials of enhanced interlayer distance having thermal stability. Most techniques rely upon the introduction of an inorganic "pillaring" agent between the layers of a layered material.

Layered metal chalcogenide materials enjoying thermal stability can be prepared by a method described in U.S. application Ser. No. 879,787, filed June 27, 1986 now U.S. Pat. No. 4,859,648, and incorporated herein by reference. The method comprises: treating a layered chalcogenide, e.g., oxide, of at least one element having an atomic number of 4, 5, 12 to 15, 20 to 33, 38 to 51, 56 to 83 and greater than 90, inclusive, which contains ion exchange sites having interspathic cations associated therewith, with an organic compound which is a cationic species, e.g., n-alkylammonium or capable of forming a cationic species e.g., n-alkylamine, to effect exchange with said interspathic cations in order to swell the layered material. An electrically neutral compound capable of conversion to an interspathic polymeric chalcogenide, e.g., tetraethylorthosilicate, is thereafter provided between the layers of the swelled, layered chalcogenide. The compound is then converted to the interspathic polymeric chalcogenide to form the layered material.

Layered materials can be prepared by a process wherein residual water is present in an organic-swelled layered material which is contacted with the electrically neutral organic compound capable of conversion to polymeric chalcogenide to form a pillared product. When the process is carried out in an open atmosphere, the components of the reaction mixture can be exposed to atmospheric moisture. However, in accordance with the present invention, it has been discovered that certain organic-swelled layered materials are difficult to intercalate by this procedure, in that extralaminar polymeric chalcogenide, e.g., extralaminar polymeric silica, can form which obstructs catalytic sites between the layers. It has now been found that undesirable extralaminar hydrolysis can be substantially avoided by the present invention.

The present invention relates to a method for intercalating an organic-swelled layered methal chalcogenide with a polymeric chalcogenide which comprises (a) contacting said organic-swelled layered metal chalcogenide with a compound capable of conversion to said polymeric chalcogenide by hydrolysis, said contacting taking place in an inert atmosphere; and (b) converting said compound in the presence of water to the polymeric chalcogenide. The product of (b) may be calcined.

The inert atmosphere can be any non-reactive gas, e.g., helium argon or nitrogen, with nitrogen especially preferred. The non-reactive atmosphere should be substantially free of moisture, e.g., less than about 0.5, preferably less than 0.01 wt. % water in order to prevent extralaminar hydrolysis from occurring. The non-reactive atmosphere may be either static or dynamic. However, where a dynamic system is employed, the flow of inert gas should be low enough to prevent undesired levels of evaporation of the organic polymeric chalcogenide precursor, e.g., tetraethylorthosilicate. Such levels can range for, e.g., 500 ml of TEOS in a one liter round bottom flask, from about 0.1 to 2 scf/hr per liter, preferably about 0.3 to 0.5 scf/hr $N_2$ per liter.

For present purposes, polymeric chalcogenides are considered to include chalcogenides of two or more repeating units, preferably three or more repeating units, e.g., four or more or even five or more repeating units. The extent of polymerization of the interspathic polymeric chalcogenide is believed to affect the ultimate interlayer separation of the pillared layered metal oxide product.

The layered chalcogenide material which is organic-swelled to form the organic-swelled starting material employed in the present invention can be a layered oxide, sulfide, selenide or telluride, preferably a layered oxide material of elements other than those of Group VIB of the Periodic Table, i.e., O, S, etc. Suitable layered oxide materials include layered oxides of Group IVA metals such as titanium, zirconium and hafnium, e.g., layered trititanates, such as $Na_2Ti_3O_7$ comprising $Ti_3O_7^{-2}$ layers containing interspathic alkali metals as disclosed in U.S. Pat. Nos. 4,600,503, and 2,496,993 incorporated herein by reference. Upon intercalation with polymeric silica, such tritanates are known as silicotitanates. Other layered chalcogenide materials in which the present invention may be used to facilitate intercalation include $KTiNbO_5$, as well as layered oxides of alumina and silicon such as clays, e.g. bentonite. In particular, the present invention can facilitate intercalation of layered silicates known as high silica alkali silicates whose layers lack octahedral sheets. These silicates can be prepared hydrothermally from an aqueous reaction mixture containing silica and caustic at relatively moderate temperatures and pressures, and may contain tetracoordinate framework atoms other than Si. Included among these materials are magadiite, natrosilite, kenyaite, makatite, nekoite, kanemite, okenite, dehayelite, macdonaldite and rhodesite, preferably their acid-exchanged forms.

Another layered chalcogenide which can be pillared by the present invention is a titanometallate-type layered metal oxide product comprising a layered metal oxide wherein each layer of the metal oxide has the general formula $$[M_x[\ ]_y Z_{2-(x+y)} O_4]^{q-}$$

wherein M is at least one metal of valence n wherein n is an integer between 0 and 7 and preferably is 2 or 3, [ ] represents a vacancy site, Z is a tetravalent metal, preferably titanium, and wherein $q=4y-x(n-4)$ and preferably is 0.6–0.9,
$0<x+y<2$ Interposed between the layers of the oxide will be charge-balancing cations A of charge m wherein m is an integer between 1 and 3, preferably 1. Preferably A is a large alkali metal cation selected from the group consisting of Cs, Rb, K, M and Na is a divalent or trivalent metal cation selected from at least one Mg, Sc, Mn, Fe, Cr, Ni, Cu, Zn, In, Ga and Al. For example, M can be both In and Ga. Structurally, these metal oxides are believed to consist of layers of (M, Z, or [ ]) $O_6$ octahedra which are trans edge-shared in one dimension and cis edge-shared in the second dimension forming double octahedral layers which are separated by cations in the third dimension. These materials can be prepared by high temperature fusion of a mixture of (1) metal oxide, (2) alkali metal carbonate or nitrate and (3) tetravalent metal dioxide, e.g., titanium dioxide or by fusion of a mixture of alkali metallate and tetravalent metal dioxide. Such fusion can be carried out in air in ceramic crucibles at temperatures ranging between 600° to 1100° C. after the reagents have been ground to an homogeneous mixture. The resulting product is ground to 20 to 250 mesh, preferably about 100 mesh, prior to the organic swelling and polymeric oxide intercalation steps.

Further description of layered titanometallate starting materials and their methods of preparation can be found in the following references:

Reid, A. F.; Mumme, W. G.; Wadsley, A. D. *Acta Cryst.* (1968), B24, 1228; Groult, D.; Mercy, C.; Raveau, B. *J. Solid State Chem.* 1980, 32 289; England, W. A.; Burkett, J. E.; Goodenough, J. B.; Wiseman, P. J. *J. Solid State Chem.* 1983, 49 300.

Use of these layered metal oxides as the layered starting material permits inclusion of different metal atoms into the layered starting material being treated which allows potential catalytically active sites to be incorporated in the stable layer itself. Moreover, variable amounts of metal atoms may be added to provide a catalyst with optimum activity for a particular process. Furthermore, the infinite trans-edge shared layer structure of the titanometallate-type layered metal oxides instead of the sheared 3-block structure of, for example, $Na_2Ti_3O_7$, may reduce or eliminate shearing of the layers as a possible mechanism for thermal or hydrothermal decomposition of the calcined intercalated material. These titanometallate-type materials may possess even greater thermal stability than silicotitanate molecular sieves. In addition, the variable charge density on the oxide layer possible for these layered metal oxides due to the various oxidation states of metal oxides, the incorporated metal atom and the varying stoichiometry of the materials, may allow variation in the amount of the organic cationic species which can be exchanged into the material. This, in turn, permits variation of the ultimate concentration of the oxide pillars between the layers of the final product.

The metal oxide product contains about 0.5 to about 20 weight percent of said element M, preferably about 1 to 10 weight percent. Vacancy-containing materials (wherein y is greater than zero) are particularly suited for treatment by the present method.

The titanometallate-type layered metal oxide product, after intercalation with polymeric chalcogenide the present invention comprises a layered titanometallate-type layered metal oxide and interspathic polymeric chalcogenide of at least one element, separating the layers of the metal oxide. Preferably, such materials after pillaring are thermally stable, i.e., capable of withstanding calcination at a temperature of about 450° C. for at least 2 hours without significant reduction (e.g., not greater than 10 or 20%) in the spacing between layers.

The organic swelling agent used to swell the layered starting material employed in the present invention comprises a source of organic cation such as organoammonium, which source may include the cation itself, in order to effect an exchange of the interspathic cations resulting in the layers of the starting material being propped apart. In particular, protonated alkylamines are preferred. Often, alkylammonium cations include n-dodecylammonium, n-octylammonium, n-heptylammonium, n-hexylammonium and n-propylammonium. The source of organic cation in those instances where the interspathic cations include hydrogen or hydronium ions may include a neutral compound such as organic amine which is converted to a cationic analogue during the swelling or "propping" treatment. Among these materials are $C_3$ to $C_{10}$, preferably $C_6$ to $C_8$ alkylamines, preferably n-alkylamines, or $C_3$ to $C_{10}$, preferably $C_6$ to $C_8$ alkanols, preferably n-alkanols. The present invention has been found particularly useful in pillaring materials which do not contain interspathic alkali metals, e.g., layered materials having ammonium ($NH_4^+$) ions disposed between the layers.

Interspathic polymeric chalcogenide pillars are then formed between the layers of the organic-swollen layered metal chalcogenide starting material and may include a chalcogenide, preferably a polymeric chalcogenide, of zirconium or titanium or more preferably of an element selected from Group IVB of the Periodic Table (Fischer Scientific Company Cat. No. 5-702-10, 1978), other than carbon, i.e., silicon, germanium, tin and lead. Other suitable chalcogenides include those of Group VA, e.g., V, Nb, and Ta, those of Group IIA, e.g., Mg or those of Group IIIB, e.g., B. Most preferably, the pillars include polymeric silica. In addition, the chalcogenide pillars may include an element which provides catalytically active acid sites in the pillars, preferably aluminum.

The chalcogenide pillars are formed from a precursor material which is preferably introduced between the layers of the organic "propped" species as a cationic, or more preferably, electrically neutral, hydrolyzable compound of the desired elements, e.g., those of group IVB. The precursor material is preferably an organometallic compound which is a liquid under ambient conditions. In particular, hydrolyzable compounds, e.g., alkoxides, of the desired elements of the pillars are utilized as the precursors. Suitable polymeric silica precursor materials include tetraalkylsilicates, e.g., tetrapropylorthosilicate, tetramethylorthosilicate and, most preferably, tetraethylorthosilicate. Where the pillars are also required to include a different polymeric metal oxide, e.g., alumina or titania, a hydrolyzable compound of said metal can be contacted with the organic "propped" species before, after or simultaneously with the contacting of the propped titanometallate with the silicon compound. Preferably, the hydrolyzable aluminum compound employed is an aluminum alkoxide, e.g., aluminum isopropoxide. If the pillars are to include titania, a hydrolyzable titanium compound such as titanium alkoxide, e.g., titanium isopropoxide, may be used. In addition, the chalcogenide precursor may contain zeolite precursors such that exposure to conversion conditions results in the formation of interspathic zeolite material as at least part of the chalcogenide pillars. Pillars of polymeric silica and polymeric alumina or polymeric silica and polymeric titania are particularly preferred.

After the final hydrolysis to produce the chalcogenide pillars and calcination to remove the organic propping agent, the final pillared product may contain residual exchangeable cations. Such residual cations in the layered material can be ion exchanged by known methods with other cationic species to provide or alter the catalytic activity of the pillard product. Suitable replacement cations include cesium, cerium, cobalt, nickel, copper, zinc, manganese, platinum, lanthanum, aluminum, ammonium, hydronium and mixtures thereof.

The resulting pillared products exhibit thermal stability at temperatures of 500° C. or even higher as well as substantial sorption capacities (as much as 10 to 25 wt % for $H_2O$ and $C_6$ hydrocarbon). Silica-pillared products possess interlayer separations of greater than 12A and surface areas greater that 250 $m^2/g$ when divalent metal atoms, e.g., Mg, Ni, Cu and Zn, are present as the metal M of the product. Silica-pillared products incorporating trivalent metal atoms, e.g., Sc, Mn, Fe, Cr, In, Ga and Al can possess interlayer separations of 6 to 15A.

It has also been found that layered materials containing interspathic polymeric chalcogenide can be improved when their preparation includes conditions which facilitate removal of organic hydrolysis by-products produced during conversion to polymeric chalcogenides. For example, where tetraalkylorthosilicate is used as the organic precursor, alkanols are produced during hydrolysis. By maintaining temperatures which enhance removal of such alkanols, the rate and extent of hydrolysis are enhanced. Where tetraethylorthosilicate (TEOS) is used, ethanol is a hydrolysis by-product. By conducting polymeric chalcogenide precursor incorporation and hydrolysis at 50° to 160° C., preferably 75° to 85° C., say about 80° C., pillared products having enhanced crystallinity and interlayer spacings are prepared. Moreover, organic hydrolysis by-products removal can be facilitated by conducting hydrolysis in a system which permits removal of the organic hydrolysis by-products from the system. Preferably, such a system contains a means for preventing the introduction of water from outside the system, for example, an outlet tube connected to a silicone fluid bubbler.

The present invention is illustrated further by the following Examples. In these Examples, X-ray diffraction data were obtained by standard techniques using K-alpha doublet of copper radiation. Nitrogen BET surface areas are reported in $m^2/g$.

EXAMPLE 1

Octylammonium titanate was prepared by octylamine treatment of an ammonium-exchanged $Na_2Ti_3O_7$ as follows:

(Note: All treatments in the following procedure were carried out at room temperature unless otherwise specified.)

A sample of $Na_2Ti_3O_7$ was prepared by calcining an intimate mixture of 1000 g of $TiO_2$ and 553 g $Na_2CO_3$ in air at 1832° F. for 20 hours (heat up rate=5° F./min). This mixture was then reground and reheated in air at 1832° F. for 20 hours (heat up rate=5° F./min). The product was stirred in 1.5 liters of water for one hour, filtered, dried in air at 250° F. for one hour, and calcined in air at 1000° F. for one hour. This product was slurried in 900 grams of water and ball milled for 16 hours. The solid $Na_2Ti_3O_7$ product was filtered and dried for 24 hours.

The entire 1,194 gram batch of this ball milled product was exchanged five times at 185°–195° F. with a solution of 4,240 grams of 50% ammonium nitrate diluted to 10 liters with water. The solid product was filtered and washed with 20 liters of water after each exchange. This product was dried for 24 hours after the final exchange.

An 800 gram batch of the ammonium-exchanged trititanate was refluxed with stirring for 48 hours in a mixture of 800 grams of octylamine in 5,300 grams of water. Subsequently, another 800 gram aliquot of octylamine was added, and the resulting mixture was stirred at reflux for an additional six days and then at room temperature for seven additional days. The solution was decanted and the solids filtered using one liter of ethanol to assist filtration. The product was washed with 20 liters of water and dried overnight. Seven hundred and fifty grams of this product was refluxed with 1,000 grams of octylamine for six hours. The mixture was cooled to less than 160° F., one liter of ethanol was added, and the product was filtered and dried overnight.

This dried material was reslurried in one liter of ethanol for one hour, filtered, and dried for 24 hours. The product was then refluxed in 750 grams of octylamine in a four-necked, five liter round bottom flask equipped with a Dean-Stark trap. Reaction temperature increased in a one hour interval from about 275° F. to about 347° F. as water was removed from the system via the Dean-Stark trap. The mixture was refluxed at 347° F. for two hours and then cooled to less than 160° F. One liter of ethanol was then added, and the solid product was filtered and dried overnight. The dried product was reslurried in one liter of ethanol for one hour, filtered, and dried again overnight. This product was then stirred in three liters of water for 24 hours, filtered, and dried for 42 hours. The octylammonium swollen trititanate had the following composition:

| | | |
|---|---|---|
| $TiO_2$ | 73.10 | wt % |
| C | 8.97 | wt % |
| N | 2.30 | wt % |
| Na | 1160 | ppm |
| Ash | 77.40 | wt % |

One 7.5 g sample of this material was stirred in tetraethylorthosilicate (TEOS) for 3 days at room temperature in a beaker covered with a watchglass (I) A second sample was treated similarly except that the reaction was carried out in a round-bottomed flask equipped with a nitrogen inlet tube and an outlet tube connected to a silicone fluid bubbler. Treatment was performed under a slow nitrogen purge (about 0.2 scf/hr $N_2$) (II). The products were calcined at 950° F. in $N_2$ for two hours at a heat-up rate of 5° F./min and then in air under the same conditions to produce a material having the following properties:

| | I<br>Open Vessel<br>Treatment | II<br>$N_2$ Purge<br>Treatment |
|---|---|---|
| Wt. % $SiO_2$ | 19.1 | 11.0 |
| XRD (low two theta, d-spacing) | 5.1°, 17.3A | 5.3°, 16.7A |
| Surface Area ($m^2$/g) | 219 | 145 |

Both materials had similar interlayer separations, although the sample prepared in an open vessel had higher surface area and more silica. This higher silica level is most likely due to the formation of extralaminar silica due to hydrolysis of TEOS by moisture in the air during treatment. The presence of external silica may also account for the higher surface area.

EXAMPLE 2

$Cs_2CO_3$ (621 g) and $TiO_2$ (795 g) were fired at 650° C. three times, with intermediate grindings between firings. The fired material was ball-milled for 4 hrs (30% solids in $H_2O$), then exchanged five times with 1M $NH_4NO_3$ (10 ml $NH_4NO_3$/g solid) at reflux for 20 hrs. After each exchange the sample was filtered and washed with 2 l hot water. The ammonium exchanged solid was swollen by refluxing in neat octylamine for 24 hrs. using a Dean-Stark trap in the condensation column to remove water from the system. The swollen solid was filtered and washed with 2000 ml EtOH, then air dried. This solid was treated with tetraethylorthosilicate (5 g TEOS/g solid) under nitrogen at 80° C. for 20 hrs, filtered and dried under nitrogen. The TEOS treatment was repeated once. The pillared material was obtained by calcining the dried TEOS treated material in flowing air at 500° C. for 240 minutes. Chemical and physical properties of the catalyst are summarized in Table 1.

TABLE 1

| | |
|---|---|
| Cs, ppm | 23 |
| Ti, wt % | 29.0 |
| $SiO_2$, wt % | 44.9 |
| Ash, wt % (1000° C.) | 97.52 |
| Surface Area, $m^2$/g | 526 |
| Sorption, wt % | |
| $H_2O$ | 22.7 |
| n-$C_6$ | 14.3 |
| cyclohexane | 15.7 |
| Density, g/cc | |
| Real | 2.799 |
| Particle | 0.83 |

We claim:
1. A method for intercalating an organic-swelled layered metal chalcogenide with a polymeric chalcogenide which comprises:
  (a) contacting said organic-swelled layered metal chalcogenide with a compound capable of conversion to said polymeric chalcogenide by hydrolysis, said contacting taking place in an inert atmosphere; and
  (b) converting said compound in the presence of water to the polymeric chalcogenide.
2. The method of claim 1 wherein said inert atmosphere is nitrogen.
3. The method of claim 2 wherein said nitrogen is introduced at about 0.1 to about 2 scf/hr per liter.
4. The method of claim 3 wherein said nitrogen is introduced at about 0.3 to 0.5 scf/hr per liter.
5. The method of claim 1 wherein the product of (b) is calcined.
6. The method of claim 1 wherein said polymeric chalcogenide is an polymeric oxide and said layered metal chalcogenide is a layered oxide.
7. The method of claim 1 wherein said converting is effected by the addition of water.
8. The method of claim 6 wherein said polymeric oxide comprises polymeric silica.
9. The method of claim 1 wherein said layered metal chalcogenide is titanometallate-type layered metal oxide product comprising a layered metal oxide wherein each layer of the metal oxide has the general formula

$$[M_x[\ ]_y Z_{2-(x+y)}O_4]^{q-}$$

wherein M is at least one metal of valence n wherein n is an integer between 0 and 7 and preferably is 2 or 3, [ ] represents a vacancy site, Z is a tetravalent metal, preferably titanium, and wherein $$q=4y-x(n-4), \text{ and } 0<x+y<2$$

10. The method of claim 1 wherein said layered metal chalcogenide is a titanate.
11. The method of claim 10 wherein said titanate comprises $Ti_3O_7^{-2}$ layers.
12. The method of claim 1 wherein said layered metal chalcogenide is a high silica alkali silicate.
13. The method of claim 12 wherein said silicate is selected from the group consisting of magadiite, natrosilite, kenyaite, makatite, nekoite, kanemite, okenite, dehayelite, macdonaldite and rhodesite.

14. The method of claim 13 wherein said silicate is magadiite.

15. The method of claim 1 wherein said electrically neutral compound is tetraalkylorthosilicate.

16. The method of claim 1 wherein said electrically neutral compound is tetraethylorthosilicate.

17. The method of claim 1 wherein said swelling organic is alkylamine.

18. The method of claim 1 wherein said swelling organic is n-octylamine.

19. The method of claim 1 wherein said swelling organic is alkylammonium.

20. The method of claim 1 wherein said swelling organic is n-octylammonium.

* * * * *